United States Patent
Wang et al.

(10) Patent No.: US 10,533,604 B2
(45) Date of Patent: Jan. 14, 2020

(54) LINEAR MODULE

(71) Applicant: HIWIN TECHNOLOGIES CORP., Taichung (TW)

(72) Inventors: Yan Jun Wang, Taichung (TW); Ciao Cun Hong, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 106 days.

(21) Appl. No.: 15/849,076

(22) Filed: Dec. 20, 2017

(65) Prior Publication Data

US 2019/0185270 A1    Jun. 20, 2019

(51) Int. Cl.
| | |
|---|---|
| *F16H 25/18* | (2006.01) |
| *F16C 29/08* | (2006.01) |
| *F15B 15/08* | (2006.01) |
| *B65G 15/36* | (2006.01) |
| *F16C 29/06* | (2006.01) |
| *F16C 29/00* | (2006.01) |

(52) U.S. Cl.
CPC ............ *F16C 29/084* (2013.01); *B65G 15/36* (2013.01); *F15B 15/082* (2013.01); *F15B 15/084* (2013.01); *F16C 29/005* (2013.01); *F16C 29/065* (2013.01); *F16C 29/08* (2013.01)

(58) Field of Classification Search
CPC ...... F16C 29/084; F16C 29/08; F16C 29/065; F16C 29/005; F15B 15/082; F15B 15/084; F16H 2025/204; B65G 15/36
See application file for complete search history.

(56) References Cited

U.S. PATENT DOCUMENTS

| | | | |
|---|---|---|---|
| 5,074,160 A | 12/1991 | Kasuga | |
| 8,302,498 B2 * | 11/2012 | Shirai | F16C 29/063 74/89.22 |
| 8,650,978 B2 | 2/2014 | Aso et al. | |
| 2007/0092311 A1 * | 4/2007 | Fujimoto | G03G 15/2053 399/328 |

FOREIGN PATENT DOCUMENTS

| | | | |
|---|---|---|---|
| CN | 204628288 U | * | 9/2015 |
| CN | 204628288 U | | 9/2015 |
| TW | 530627 B | | 7/2015 |

* cited by examiner

*Primary Examiner* — Jake Cook
*Assistant Examiner* — Randell J Krug
(74) *Attorney, Agent, or Firm* — Wang Law Firm, Inc.

(57) ABSTRACT

A linear module includes: a base, a slide stage, two support frames, two retaining units and a steel belt. With the pivoting freedom given by the guide portions of the retaining units, when the slide stage moves, the rolling elements can be abutted more closely against the contact surface of the steel belt via the pivoting of the guide portions, so as to reduce the occurrence of deformation and clearance produced by the steel belt, which not only improves the sealing performance of the steel belt and operation smoothness of the linear module, but also produces a dust proof effect, thus achieving the purposes of automatically adjusting contact angle, preventing deformation while extending the life of the steel belt.

4 Claims, 10 Drawing Sheets

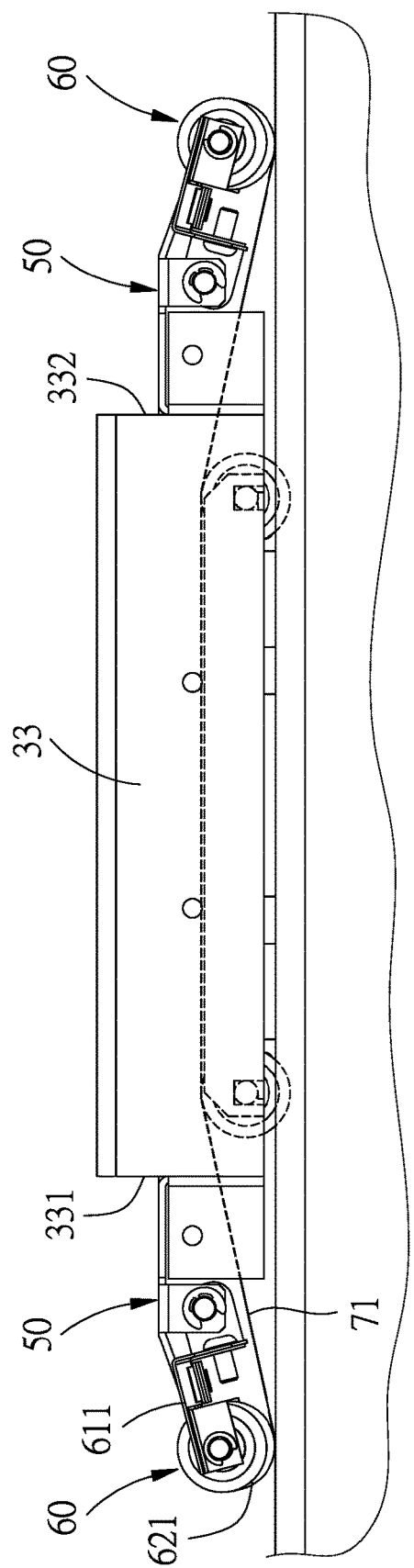
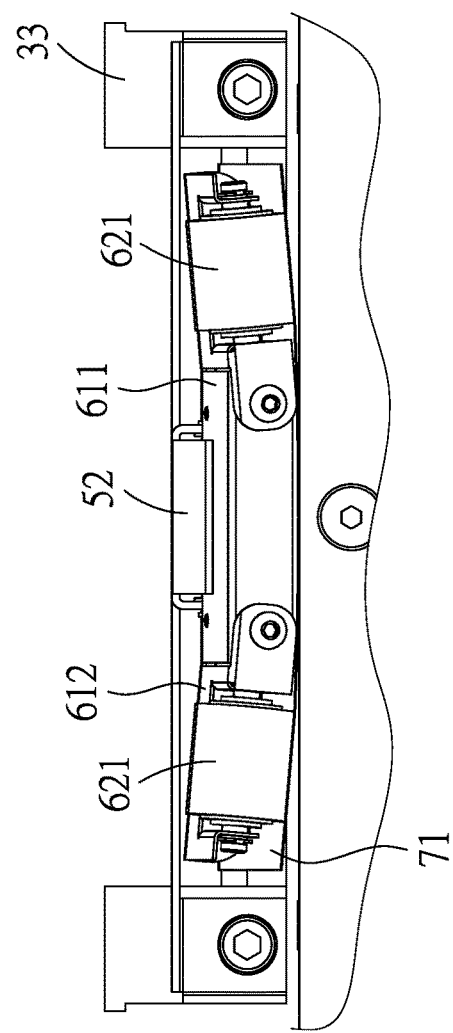
FIG.6
FIG.7

LINEAR MODULE

BACKGROUND

Field of the Invention

The present invention relates to a linear module, and more particularly to a linear module with a steel belt which can be prevented from deformation.

Related Prior Art

Referring to FIG. 1A, which is a cross sectional view showing a "Linear actuator provided with steel mechanism" disclosed in U.S. Pat. No. 8,650,978B2, wherein the linear actuator includes: a screw shaft, a movable stage 11 movably disposed on the screw shaft, a housing member is provided for mounting of the screw shaft and includes openings sealed with steel belts 12. The respective steel belts 12 are installed in a rolled-up manner and tensioned between the roller 13 and the housing member, so as to improve the sealing performance of the steel belts 12. However, when the tension force of the steel belts 12 is increased, wear will also be increased, which will make the steel belts 12 more deformed more easily.

Referring to FIG. 1B, which is a cross sectional view showing a movable stage disclosed in Taiwan Patent No. 1530627, the movable stage is mounted on a rail 101, and includes a slide block 102 movable along a longitudinal path of the rail 101. The slide block 102 includes: two ends along the longitudinal path, a middle protruding portion between the two ends, two lateral walls located at two opposite sides of the middle protruding portion to define a recess therebetween, a cover 103 covering the slide block 102, a plurality of magnets 104 disposed at the top of the two ends of the slide block 102, and a steel belt 105 inserted through the recess and located between the cover 103 and the slide block 102. The parts of the steel belt 105 above the two ends of the slide block 102 are magnetically attracted by the magnets 104, and the portion of the steel belt 105 between the two ends of the slide block 102 protrudes upwards. Arranging the magnets 104 at two ends of the slide block 102 to magnetically attract the steel belt 105 can make the portion of the steel belt 105 between the two ends of the slide block 102 protrude upward and closely press against the top surface of the slide block 102, so as to achieve a good dust proof effect. However, single point magnetic attracting may cause sagging of the steel belt 105, which will result in wear off or deformation of the steel belt 105.

Referring to FIG. 1C, which is a cross sectional view showing a feed unit apparatus disclosed in U.S. Pat. No. 5,074,160, wherein the feeding unit apparatus includes: a screw shaft 111 with a helical groove; a slide block 112 movably disposed on the screw shaft 111; a rail 113 having an axially extending recessed groove opening upwards and the nut is guided to move linearly along the recessed groove via rolling elements rolling with in a rolling-elements circulation path; end caps 114 disposed at two ends of the nut and provided with the rolling-elements circulation path. This design employs an elastic seal pressing member 115 to press a sealing plate 116 onto each of the end caps 114, so as to improve the sealing performance of the steel belt 117. However, since the elastic seal pressing member 115 comes into direction contact with the steel belt 117, which is likely to cause wear off and deformation of the steel belt 117.

The present invention has arisen to mitigate and/or obviate the afore-described disadvantages.

SUMMARY

One objective of the present invention is to provide a linear module which is capable of automatically adjusting contact angle, preventing deformation while extending the life of the steel belt.

To achieve the above objective, a linear module in accordance with the present invention comprises: a base extending in an extension direction, and including a receiving space; a slide stage mounted on the base and movable along the extension direction, and including: an upper slide member protruding out of the receiving space, and two carrying members disposed at two opposite sides of the upper slide member, each of the carrying members including a first end surface and an opposite second end surface; two support frames fixed to the first and second end surfaces, respectively, and each including two opposite pivoting portions and a press portion; two retaining units pivotally connected to the two support frames, and each including a retaining frame and two rolling elements, the retaining frame of each of the retaining units being pivotally connected to the pivoting portion of each of the support frames, and including a pressed portion to be pressed by the press portion of each of the support frames, the rolling elements being rotatable along the extension direction; and a steel belt covering the receiving space and the upper slide member, and including a contact surface to be pressed by the rolling elements.

Preferably, each of the retaining frames and the support frames is integrally formed by thermoplastic polymer material.

Preferably, each of the retaining frames includes two guide portions pivotally connected to two sides of the pressed portion, and a receiving gap for receiving a corresponding one of the rolling elements.

Preferably, each of the retaining units further includes two stop pieces, and each of the two stop pieces includes a fixing portion fixed to the pressed portion, and a positioning portion connected to the fixing portion and disposed on the guide portions.

Preferably, each of the pivoting portions of each of the support frames is provided with an insertion hole, and each of the pressed portions includes a connecting portion which has two positioning apertures aligned with the insertion holes of each of the support frames.

Preferably, a pin is inserted through the insertion holes of each of the support frames and the positioning apertures of each of the retaining units, and includes two opposite positioning grooves protruding out of the insertion holes and the positioning apertures, and then the two positioning rings are engaged in the two positioning grooves.

A linear module in accordance with the invention includes: a base, a slide stage, two support frames, two retaining units and a steel belt. With the pivoting freedom given by the guide portions of the retaining units, when the slide stage moves, the rolling elements can be abutted more closely against the contact surface of the steel belt via the pivoting of the guide portions, so as to reduce the occurrence of deformation and clearance produced by the steel belt, which not only improves the sealing performance of the steel belt and operation smoothness of the linear module, but also produces a dust proof effect, thus achieving the purposes of automatically adjusting contact angle, preventing deformation while extending the life of the steel belt.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

FIG. 6 is a side view of the retaining unit of the linear module in accordance with the first embodiment of the invention;

FIG. 7 is a front view of the retaining unit of the linear module in accordance with the first embodiment of the invention;

DETAILED DESCRIPTION

Figure 1A:
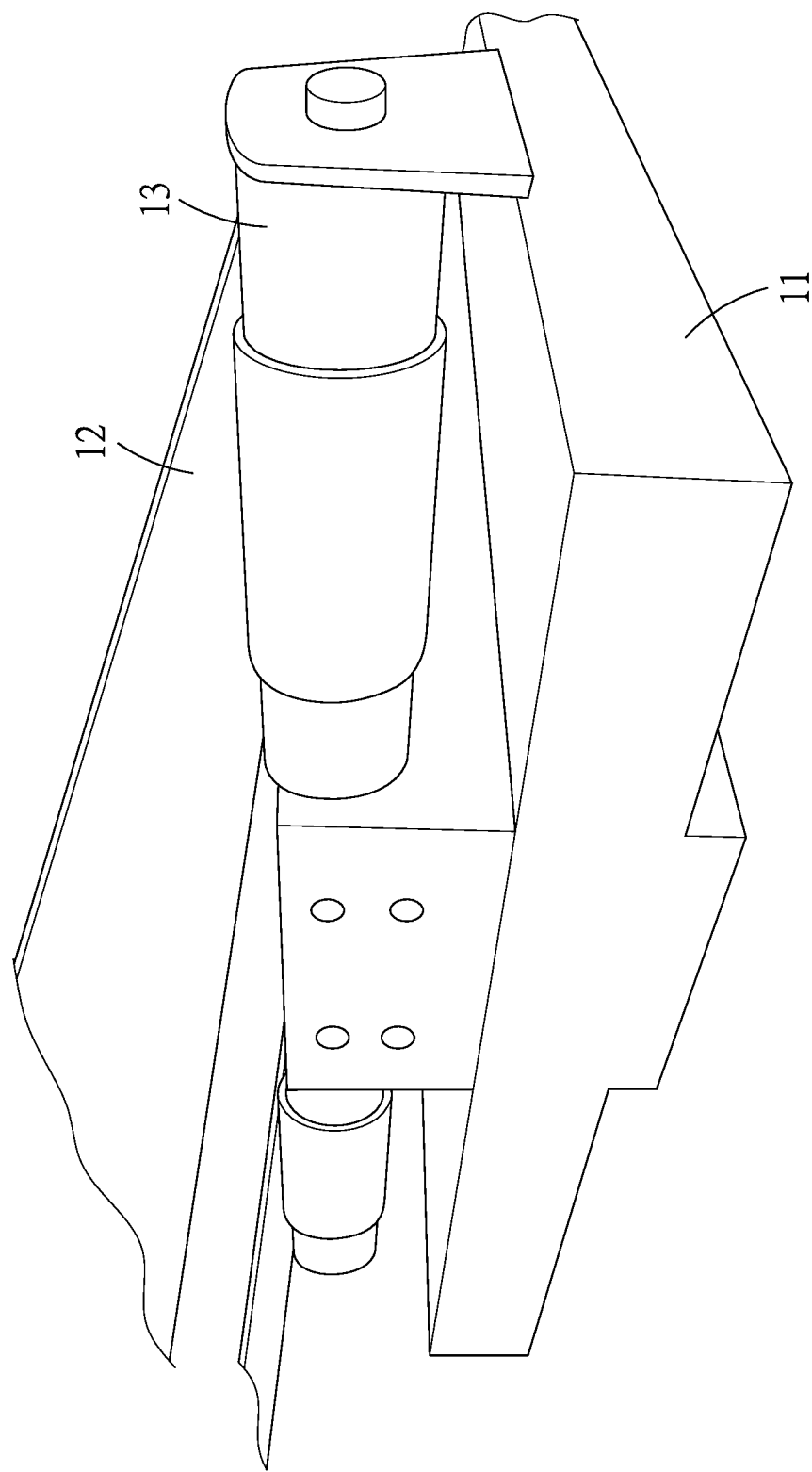
FIG. 1A is a cross sectional view showing a "Linear actuator provided with steel mechanism" disclosed in U.S. Pat. No. 8,650,978 B2.
Figure 1B:
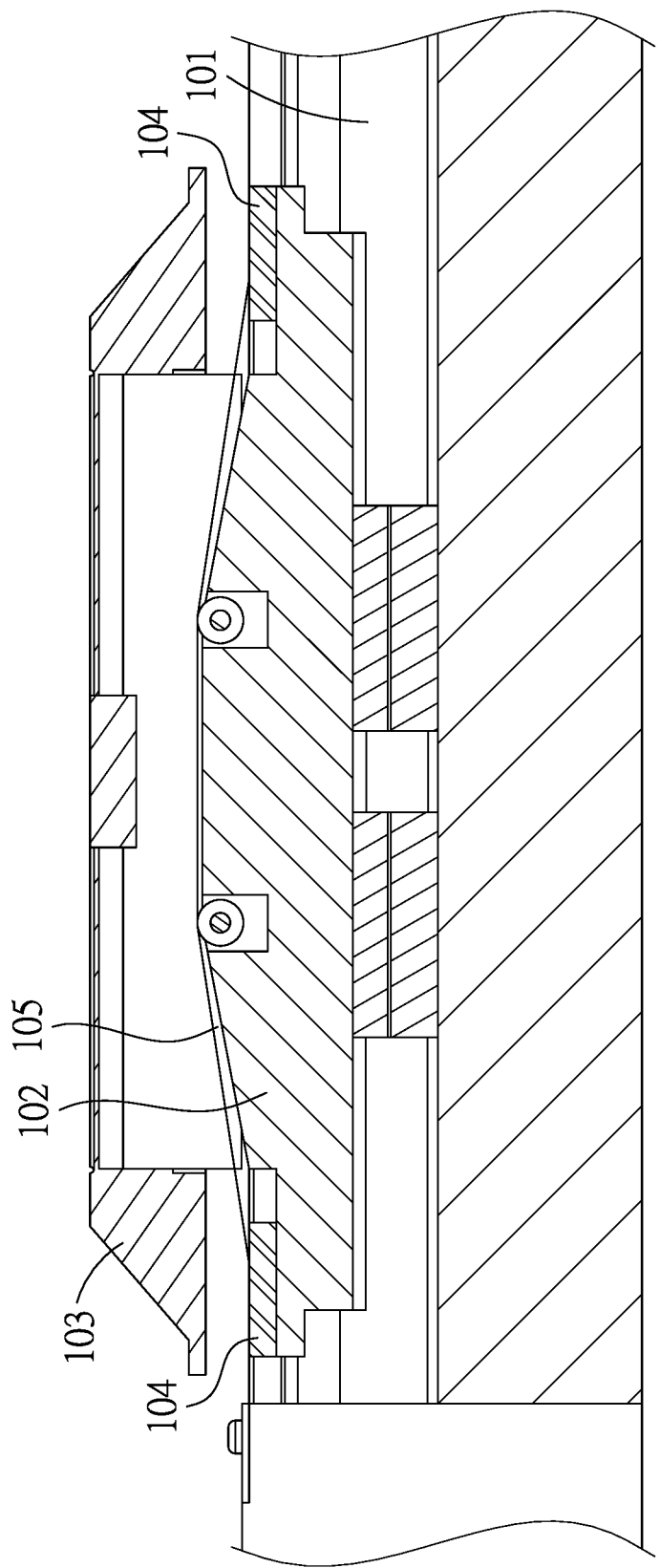
FIG. 1B is a cross sectional view showing a movable stage disclosed in Taiwan Patent No. 1530627.
Figure 1C:
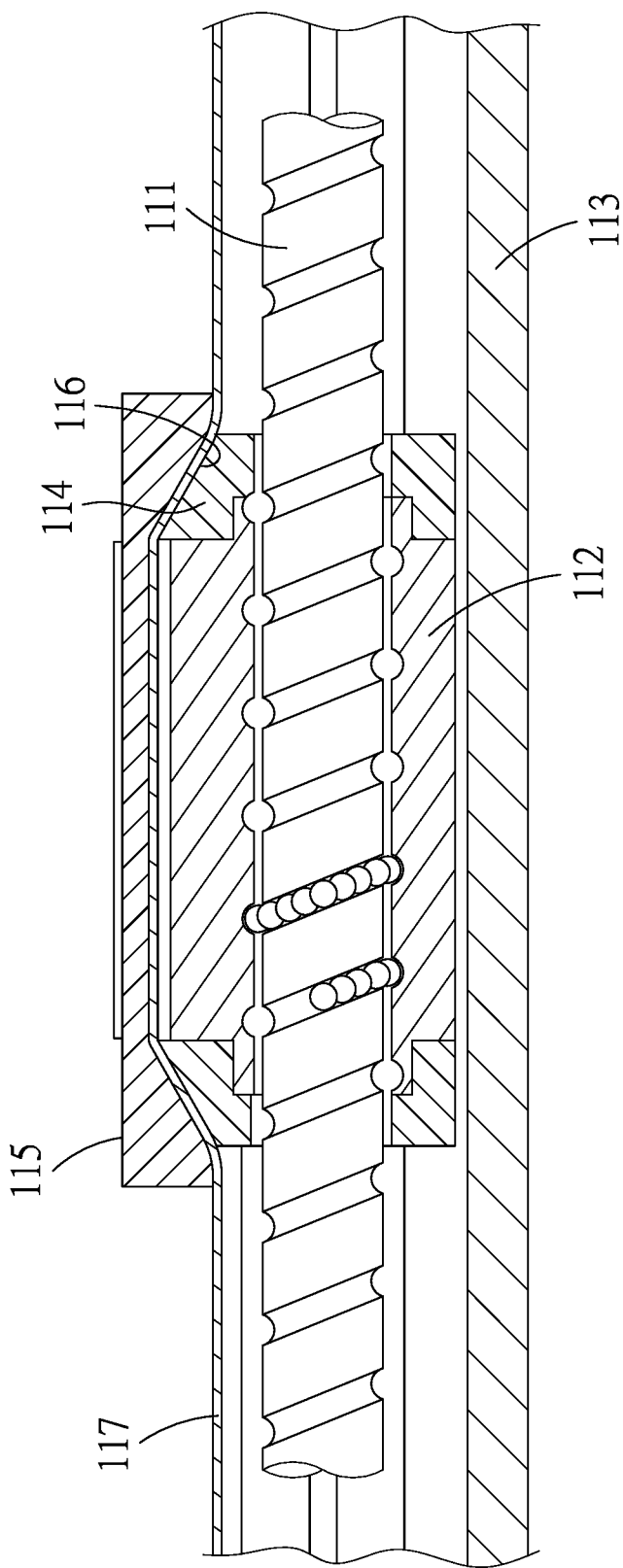
FIG. 1C is a cross sectional view showing a feed unit apparatus disclosed in U.S. Pat. No. 5,074,160.
Figure 2:
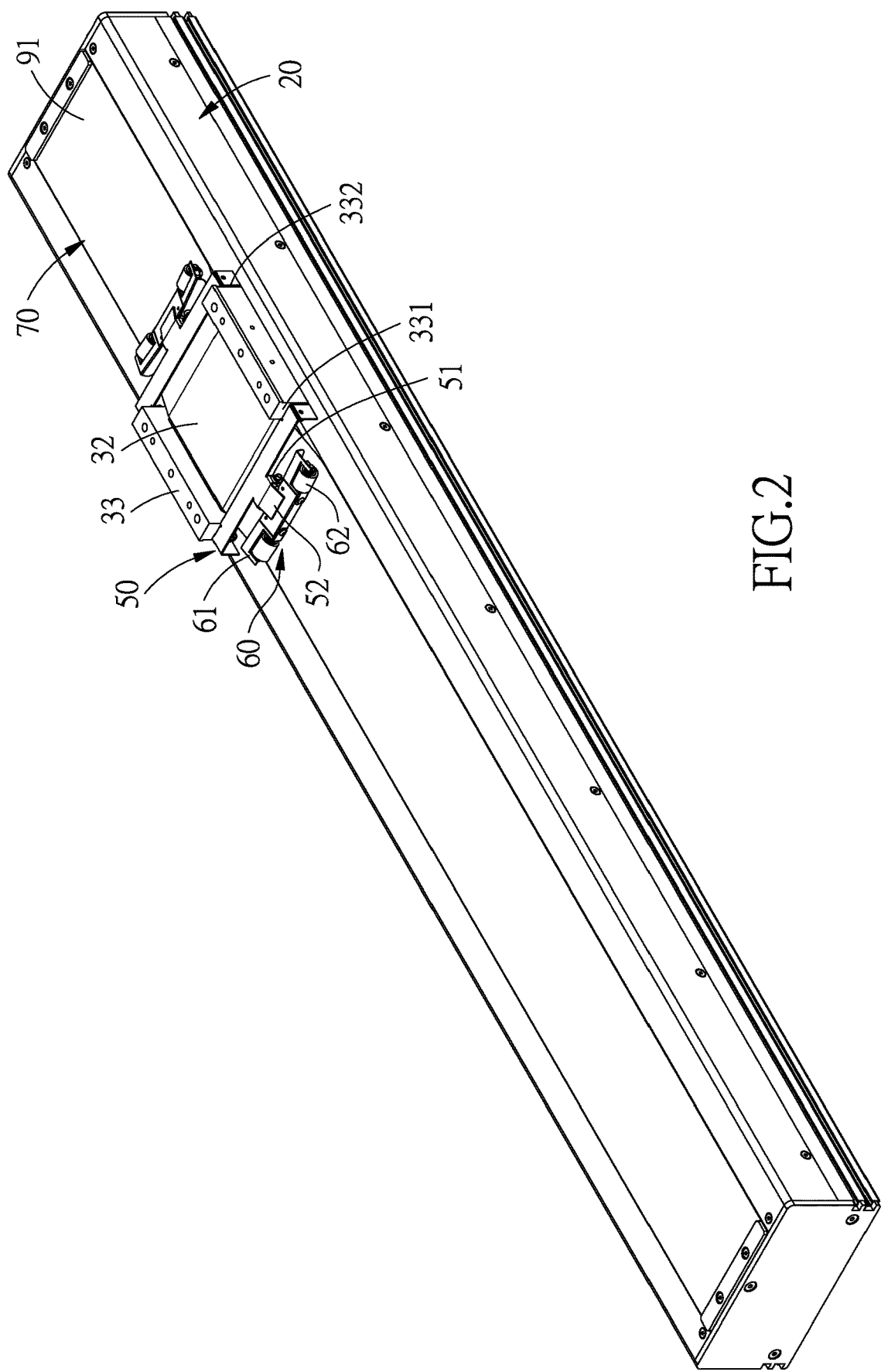
FIG. 2 is an assembly view of a linear module in accordance with a first embodiment of the invention.
Figure 3:
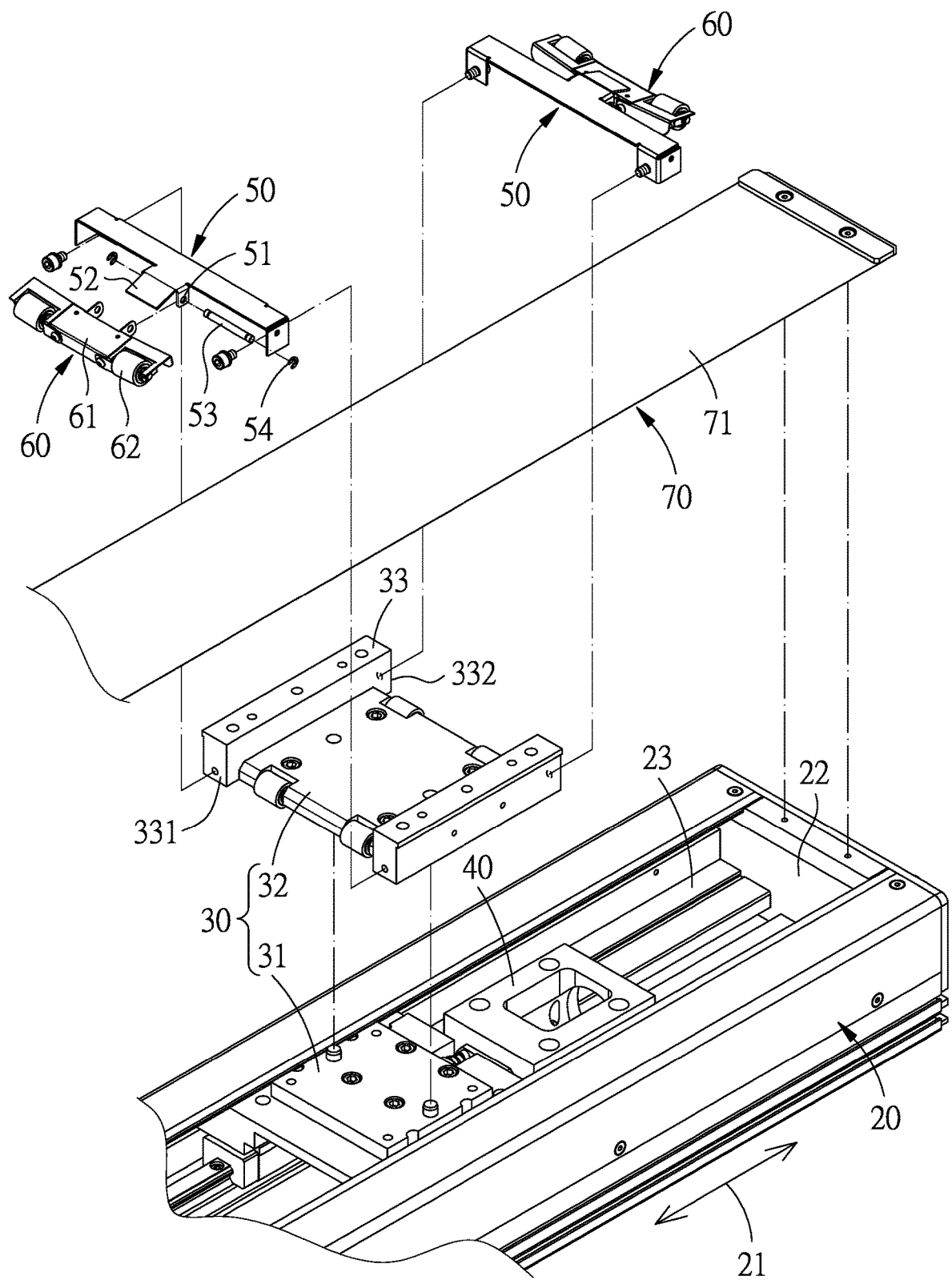
FIG. 3 is an exploded view of the linear module in accordance with the first embodiment of the invention.
Figure 4:
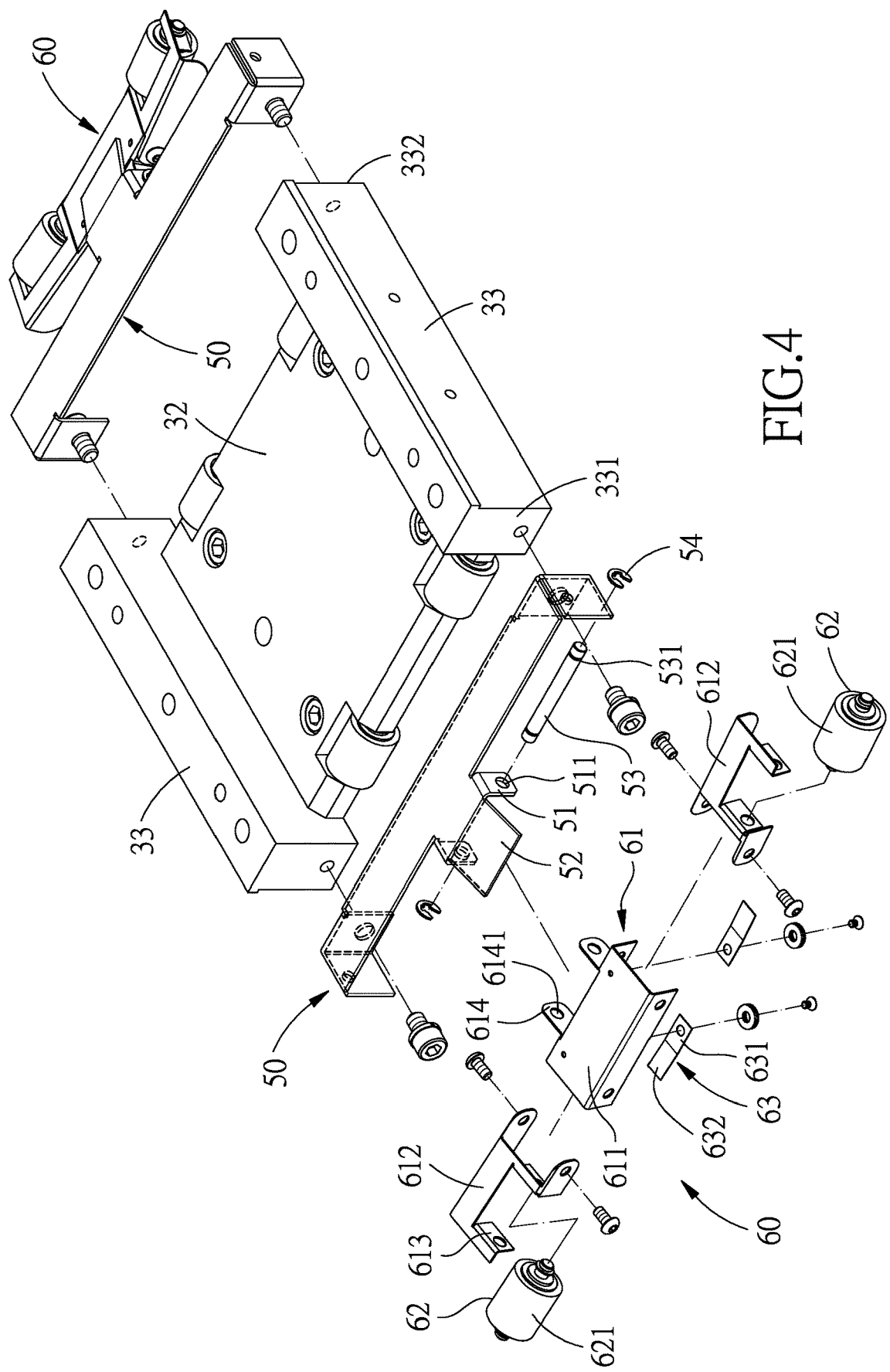
FIG. 4 is an exploded view of the retaining unit of the linear module in accordance with the first embodiment of the invention.
Figure 5:
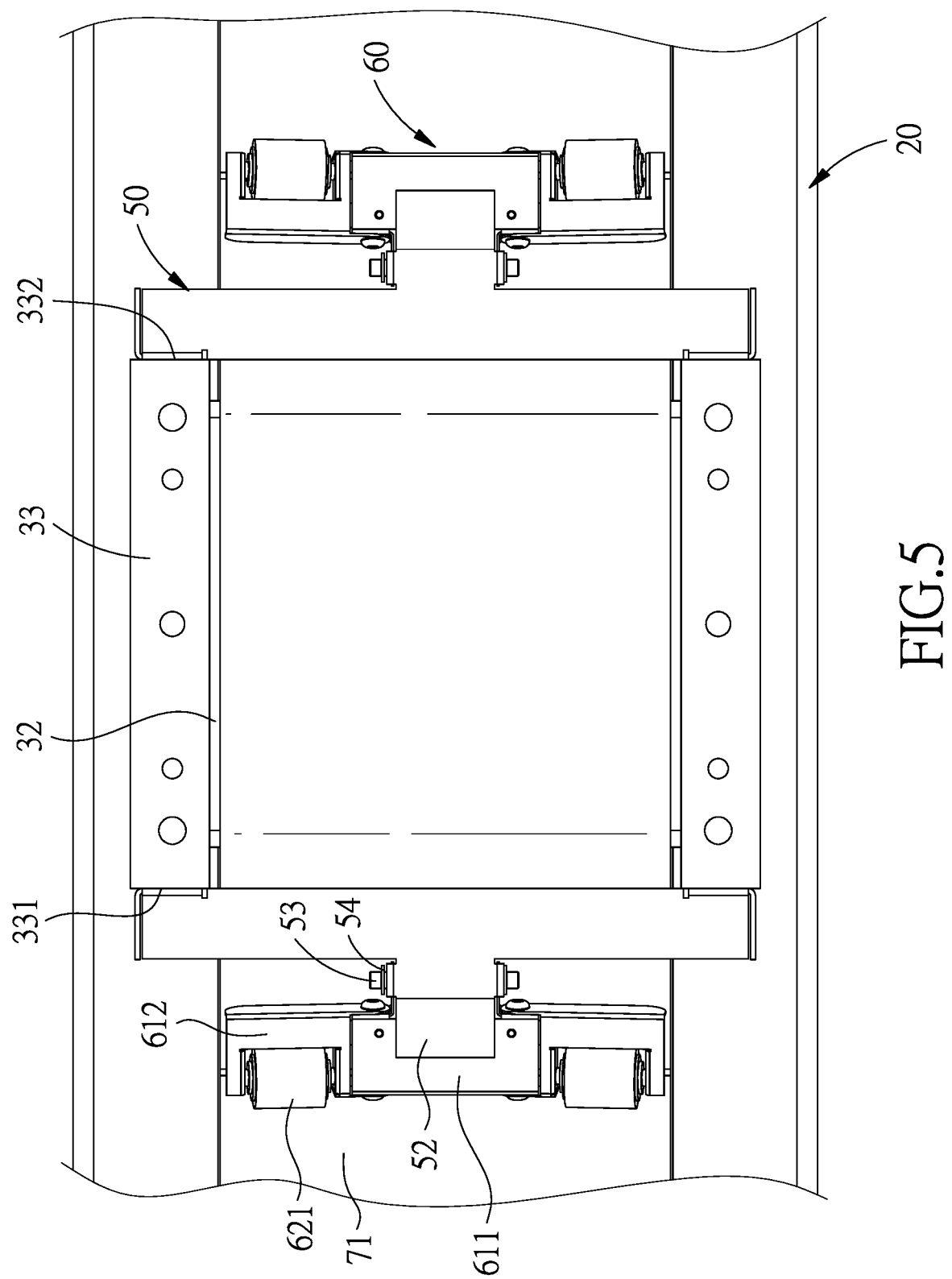
FIG. 5 is a top view of the retaining unit of the linear module in accordance with the first embodiment of the invention.

The present invention will be clearer from the following description when viewed together with the accompanying drawings, which show, for purpose of illustrations only, the preferred embodiment in accordance with the present invention.

Referring to FIGS. 2-6, a linear module in accordance with the preferred embodiment of the invention comprises: a base 20, a slide stage 30, two support frames 50, two retaining units 60 and a steel belt 70.

The base 20 is elongated, extends in an extension direction 21, and includes: an upwardly opening receiving space 22, and two opposite guide rails 23 disposed in the receiving space 22 in a parallel manner to the extension direction 21.

The slide stage 30 mounted on the base 20 and movable along the extension direction 21, and includes: a lower slide member 31 disposed in the receiving space 22 and movably mounted on the guide rails 23, an upper slide member 32 located above the lower slide member 31 and protruded out of the receiving space 22, and two carrying members 33 disposed at two opposite sides of the upper slide member 32. In this embodiment, a support seat 40 which extends in the extension direction 21 is mounted on the guide rails 23 and located at one end of the slide stage 30. The lower slide member 31 and the support seat 40 are assembled and operate in a conventional way, therefore, further detailed description will be omitted. The carrying members 33 each include a first end surface 331 and an opposite second end surface 332.

The two support frames 50 are fixed to the first and second end surfaces 331, 332, respectively, and each include two opposite pivoting portions 51 and a press portion 52 located between the two pivoting portions 51 and inclined downwards. Each of the pivoting portions 51 includes an insertion hole 511.

Referring then to FIGS. 4-7, the two retaining units 60 are pivotally connected to the two support frames 50, and each include a retaining frame 61 and two rolling elements 62. The retaining frames 61 are pivotally connected to the pivoting portions 51 and each include a pressed portion 611 to be pressed by the press portion 52. The rolling elements 62 are pivotally mounted on each of the retaining frames 61, rotatable along the extension direction 21, and each include a rolling surface 621. In this embodiment, each of the retaining frames 61 includes two guide portions 612 pivotally connected to two sides of the pressed portion 611, and a receiving gap 613 for receiving a corresponding one of the rolling elements 62. Each of the pressed portions 611 includes a connecting portion 614 which includes two positioning apertures 6141 aligned with the insertion holes 511. Then, a pin 53 is inserted through the insertion holes 511 and the positioning apertures 6141 to pivotally connect the pivoting portions 51 of each of the support frames 50 to the connecting portion 614 of each of the retaining units 60, and includes two opposite positioning grooves 531 protruding out of the insertion holes 511 and the positioning apertures 6141, and then two positioning rings 54 are engaged in the two positioning grooves 531. Besides, each of the retaining units 60 includes two stop pieces 63, and each of the two stop pieces 63 includes a fixing portion 631 fixed to the pressed portion 611, and a positioning portion 632 connected to the fixing portion 631 and disposed on the guide portions 612. The positioning portion 632 is inclined to restrict the inclination angle of the guide portions 612, so as to consequently prevent the rolling surface 621 of a corresponding one of the rolling elements 62 from disengaging from the steel belt 70.

The steel belt 70 is disposed on the top of the base 20 to seal the receiving space 22 and cover the upper slide member 32, and includes a contact surface 71 to be pressed by the rolling elements 62. In this embodiment, the steel belt 70 is arc-shaped to make the contact surface 71 come into contact with the rolling surface 621. Besides, the steel belt 70 is located a distance from the lower slide member 31 to avoid coming into contact with the lower slide member 31.

Figure 8:
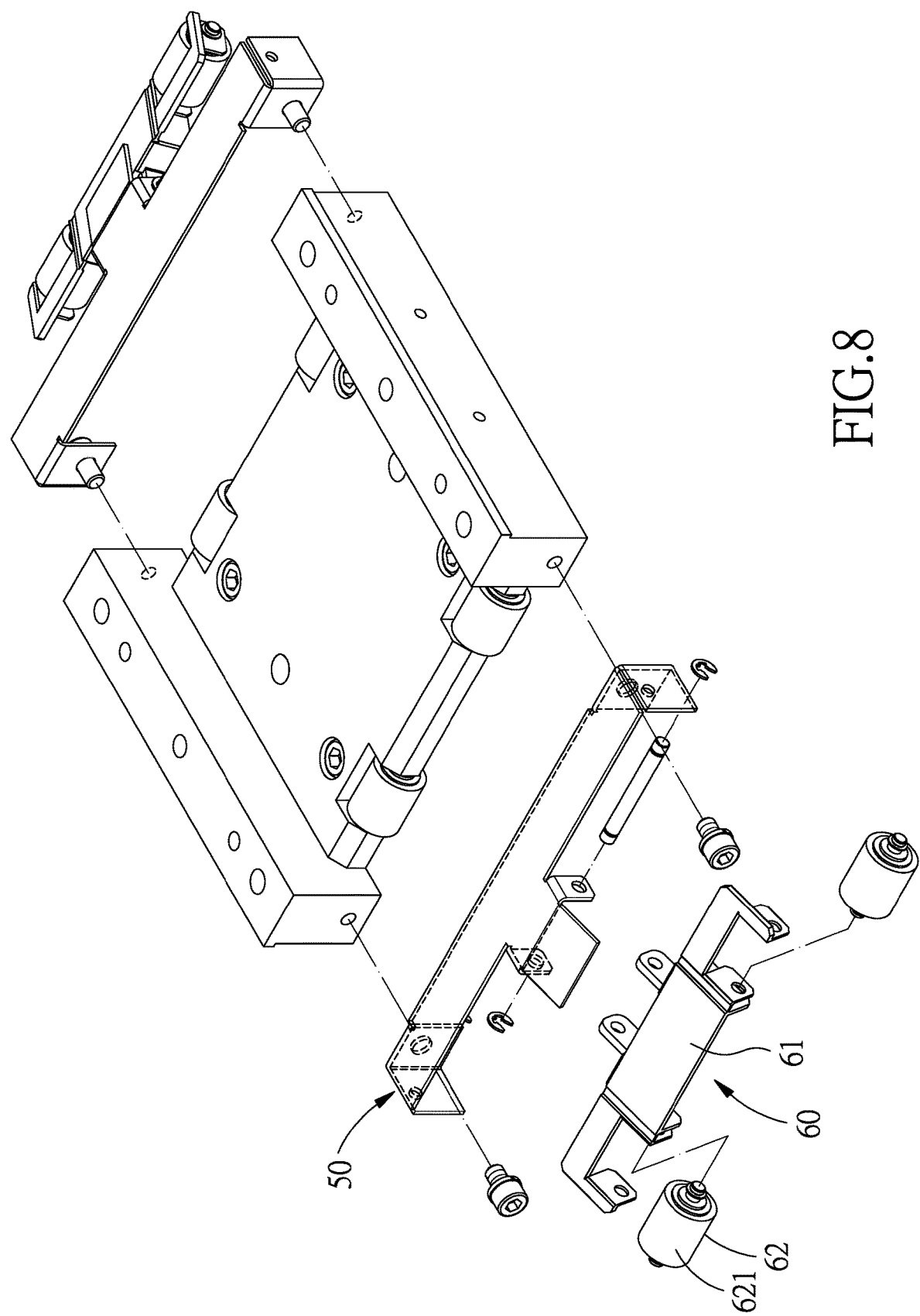
FIG. 8 is an exploded view of the retaining unit of the linear module of a second embodiment of the invention.
Figure 9:
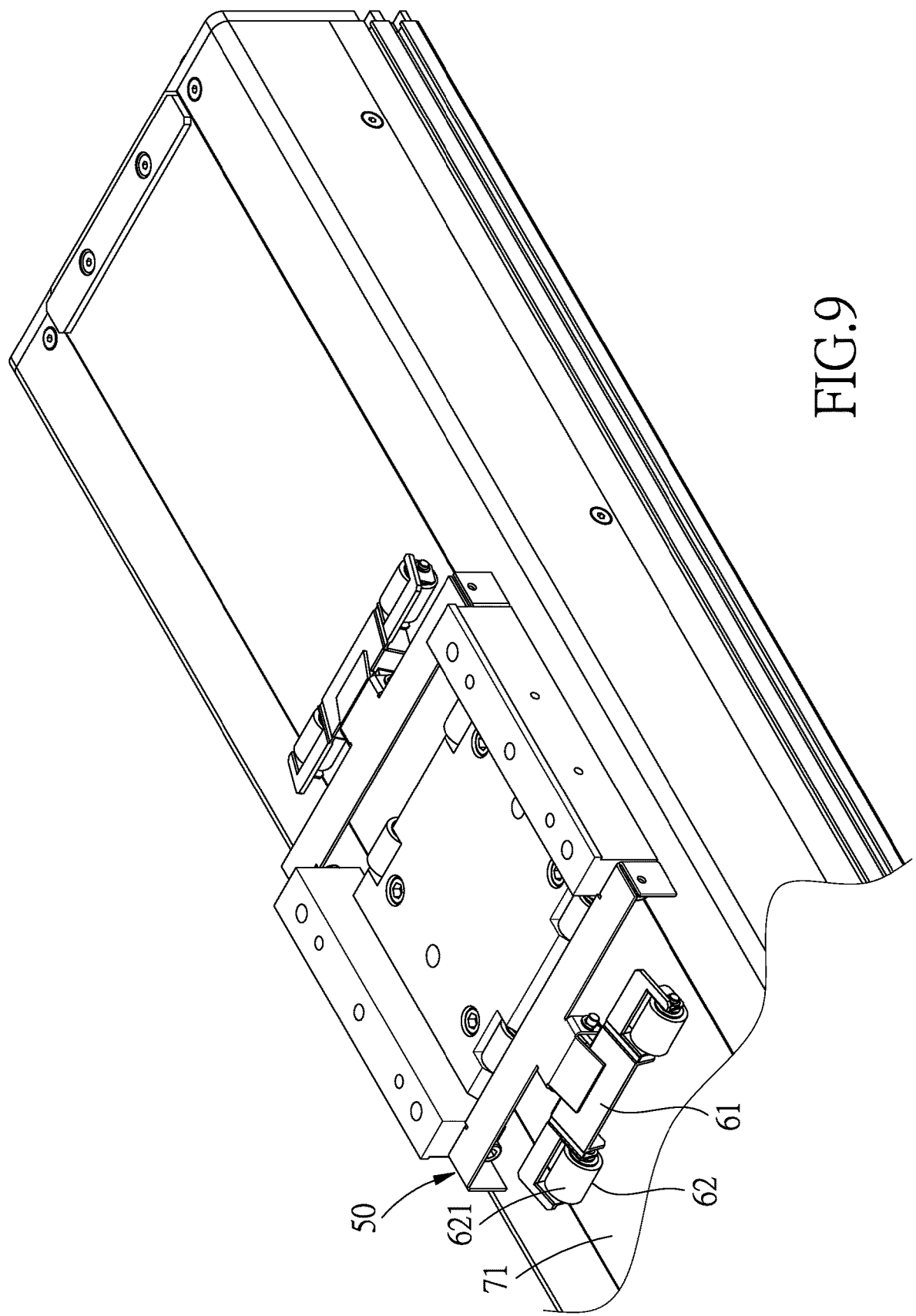
FIG. 9 is a perspective view of the linear module of the second embodiment of the invention.

It should be noted that, as shown in FIGS. 8-9, each of the retaining frames 61 and the support frames 50 is integrally formed by thermoplastic polymer material, or by other similar functional materials (the invention is not limited to the specific details disclosed in the above embodiment), so as to allow the rolling elements 62 to press more closely against the contact surface 71.

What mentioned above are the structural relations of the main components of the invention, and the advantages of the invention are explained as follows.

First of all, the rolling elements 62 are rotatably mounted on the guide portions 612, and the contact angle between the rolling elements 62 and the steel belt 70 can be adjusted automatically by the pivoting of the guide portions 612, so that the rolling elements 62 can be abutted more closely against the contact surface 71 of the steel belt 70 to reduce the occurrence of deformation of the steel belt 70, consequently improving the stability of the linear module while prolonging the life of the same.

Secondly, the steel belt 70 comes into tight and close contact with the base 20, so that impurities, such as dust, debris or other contaminants in the working environment, can be prevented from coming into the receiving space 22 to influence the function and operation of the linear module.

Thirdly, the use of the retaining units 60 not only can achieve the advantages of simple structure, low maintenance cost, but also can prevent the steel belt 70 from producing a clearance when heat is generated by the friction between the rolling elements 62 and the contact surface 71, and causing the falling of dust into the receiving space 22.

Finally, the retaining frames 61 and the support frames 50 are integrally formed by thermoplastic polymer material, therefore, they are light and have less friction and wear off, and can be abutted more closely and flatly against the contact surface 71, which is quite practical and convenient.

While we have shown and described various embodiments in accordance with the present invention, it is clear to those skilled in the art that further embodiments may be made without departing from the scope of the present invention.

What is claimed is:

1. A linear module, comprising:
   a base extending in an extension direction, and including a receiving space;
   a slide stage mounted on the base and movable along the extension direction, and including: an upper slide member protruding out of the receiving space, and two carrying members disposed at two opposite sides of the upper slide member, each of the carrying members including a first end surface and an opposite second end surface;
   two support frames fixed to the first and second end surfaces, respectively, and each including two opposite pivoting portions and a press portion;
   two retaining units pivotally connected to the two support frames, and each including a retaining frame and two rolling elements, the retaining frame of each of the retaining units being pivotally connected to the pivoting portion of each of the support frames, and including a pressed portion to be pressed by the press portion of each of the support frames, the rolling elements being rotatable along the extension direction; and
   a steel belt covering the receiving space and the upper slide member, and including a contact surface to be pressed by the rolling elements;
   wherein each of the retaining frames includes two guide portions pivotally connected to two sides of the pressed portion, and a receiving gap for receiving a corresponding one of the rolling elements, each of the retaining units further includes two stop pieces, and each of the two stop pieces includes a fixing portion fixed to the pressed portion, and a positioning portion connected to the fixing portion and disposed on the guide portions.

2. The linear module as claimed in claim 1, wherein each of the retaining frames and the support frames is integrally formed by thermoplastic polymer material.

3. The linear module as claimed in claim 1, wherein each of the pivoting portions of each of the support frames is provided with an insertion hole, and each of the pressed portions includes a connecting portion which has two positioning apertures aligned with the insertion holes of each of the support frames.

4. The linear module as claimed in claim 3 further comprising a pin and two positioning rings, the pin is inserted through the insertion holes of each of the support frames and the positioning apertures of each of the retaining units, and includes two opposite positioning grooves protruding out of the insertion holes and the positioning apertures, and the two positioning rings are engaged in the two positioning grooves.

* * * * *